Aug. 7, 1962  C. H. SKINNER  3,048,256
MOVING HANDRAIL
Filed July 31, 1958  2 Sheets-Sheet 1
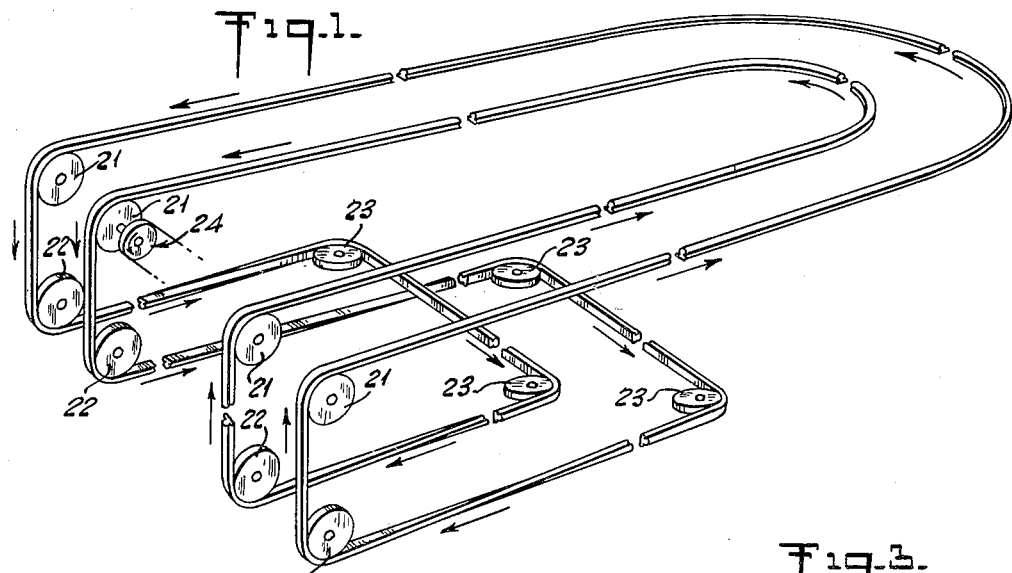
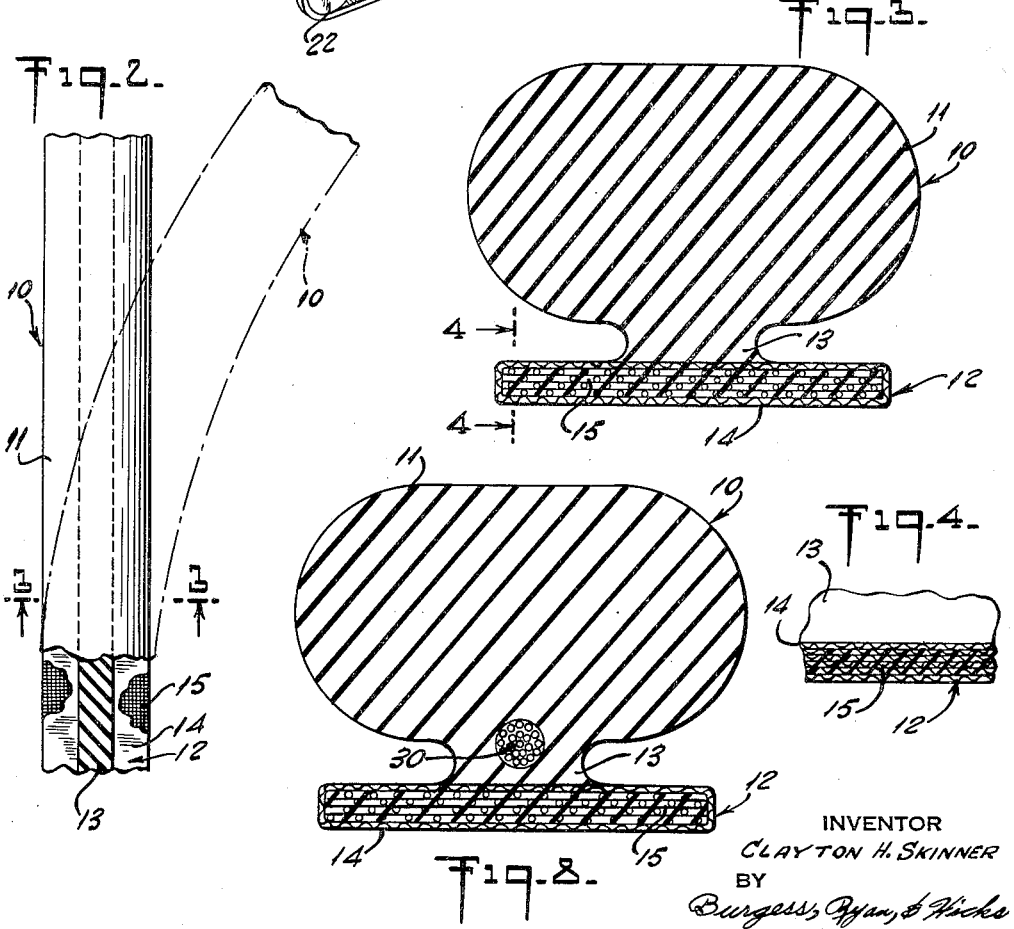
INVENTOR
CLAYTON H. SKINNER
BY
Burgess, Ryan, & Hicks
ATTORNEYS Aug. 7, 1962 C. H. SKINNER 3,048,256
MOVING HANDRAIL
Filed July 31, 1958 2 Sheets-Sheet 2
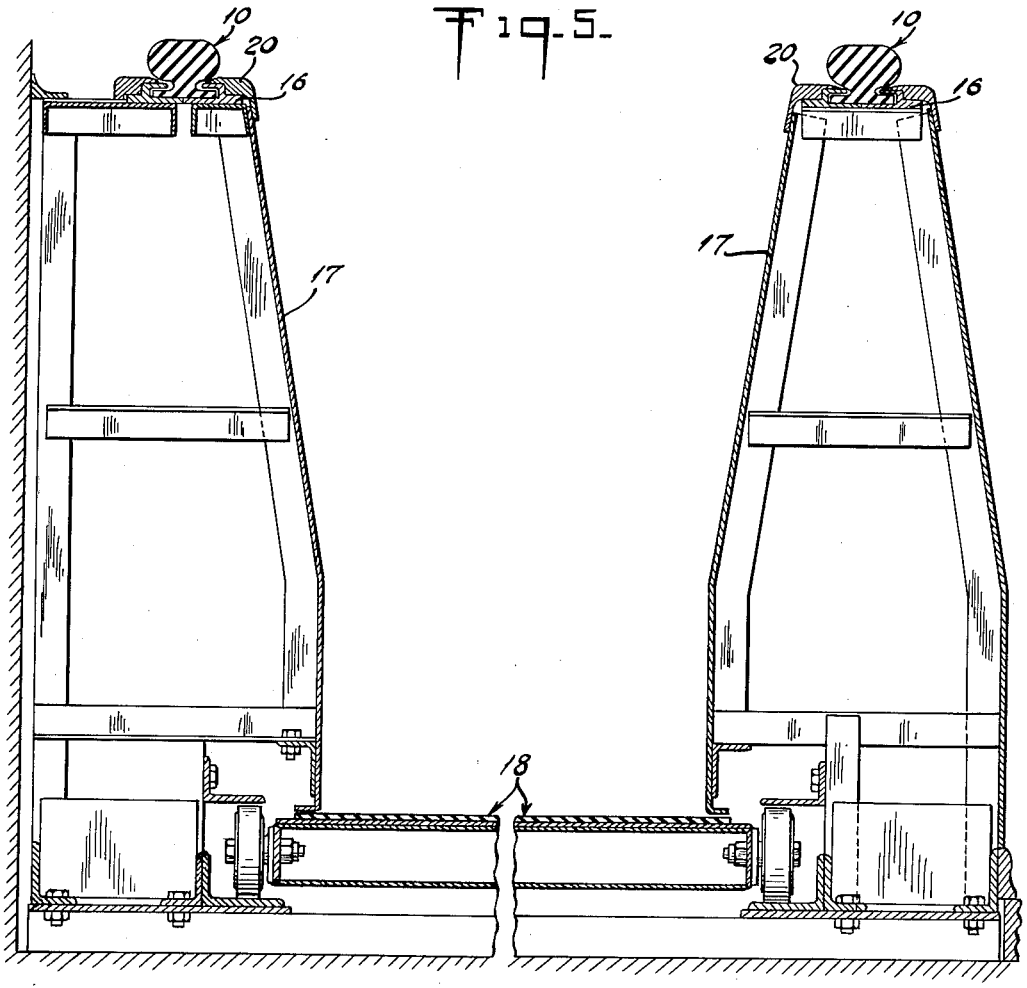
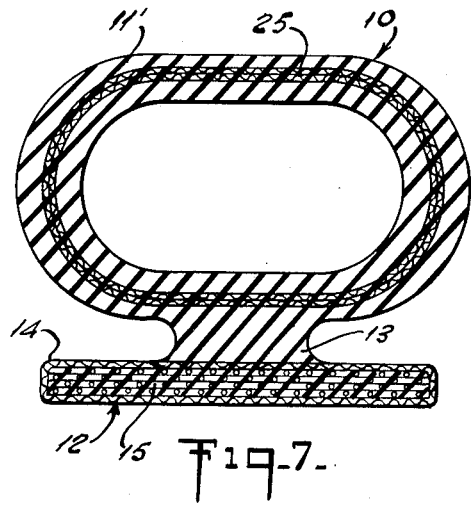
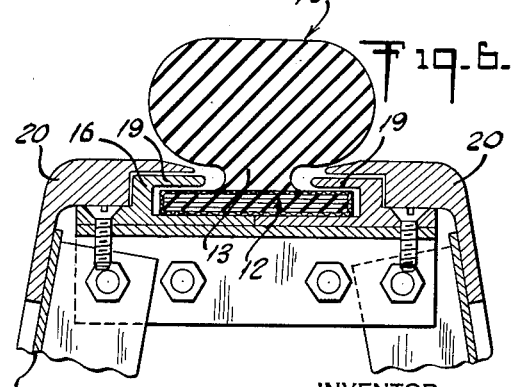
INVENTOR
CLAYTON H. SKINNER
BY
Burgess, Ryan, & Hicks
ATTORNEYS

United States Patent Office 3,048,256
Patented Aug. 7, 1962

3,048,256
MOVING HANDRAIL
Clayton H. Skinner, Kenmore, N.Y., assignor to Hewitt-Robins Incorporated, New York, N.Y., a corporation of New York
Filed July 31, 1958, Ser. No. 752,338
6 Claims. (Cl. 198—16)

The present invention relates to a moving handrail and relates, more particularly, to a moving handrail for use in conjunction with moving sidewalks, moving stairs or the like.

An object of the present invention is to provide a moving handrail which is capable of being moved around curves in both a horizontal plane and a vertical plane. Another object of the invention is to provide a handrail which may be utilized as a hand support in both directions of its travel and thus, minimize the length of handrail required for a given installation.

A further object of the invention is to provide a moving handrail which is suitable for use in long runs where considerable tension or force is required to drive the handrail.

Other objects and advantages of the invention will be apparent and better understood from the following description and the accompanying drawings, in which:

FIG. 1 is a diagrammatic illustration of an installation of a moving handrail embodying the present invention;

FIG. 2 is a plan view with portions broken away of a handrail embodying the present invention;

FIG. 3 is a section view taken along the line 3—3 of FIG. 2;

FIG. 4 is a fragmentary view in section taken along the line 4—4 of FIG. 3;

FIG. 5 is an end view in vertical section of a passenger conveyor having a moving handrail embodying the invention associated therewith;

FIG. 6 is a fragmentary view of a portion of the handrail and passenger conveyor shown in FIG. 4, but on an enlarged scale; and FIGS. 7 and 8 are end views in vertical section illustrating modifications in the construction of the handrail shown in FIGS. 2 and 3.

Referring to the drawings in detail, there is a handrail 10 which has a T-shaped section.

The upper portion 11 of the handrail, which may be of oval shape to form a hand rest, is a solid member made of flexible material such as rubber or the like so that it can be readily bent or twisted in any direction as desired. The upper portion or hand rest is integrally connected to a transmission member 12 by a web 13 which is also made of a flexible material such as rubber or the like.

The transmission member is formed by a reinforced transmission belt covered by an anti-friction material 14, such as a hard cotton duck. The transmission belt is made of rubber or similar material and incorporates one or more reinforcing plies 15 of a woven fabric.

The threads forming the woven fabric of the reinforcing plies follow an undulating path (see FIG. 4) and hence, permit the edges of the transmission belt to be compressed and elongated to a limited extent which enables the handrail to be bent around curves in a horizontal plane, as indicated by the dotted lines in FIG. 2. This enables the handrail to be used with moving sidewalks or the like which includes curves in a horizontal plane. In general, a curve in a horizontal plane through which the handrail is moved should have a radius of 9 feet or more. Due to the reinforcing plies incorporated therein, the transmission member will elongate less under stress than the upper portion of the handrail and hence, the tension or stress required to move the handrail is primarily carried by the transmission member.

The number of reinforcing plies employed along with the thickness and width of the transmission member will depend on the overall length of the handrail and the tension which must be applied thereto to move a handrail of such a length. For example, a transmission member three inches wide incorporating five reinforcing plies, each of which has a tensile strength of 75 lbs. per ply inch (at a safety factor of 10 to 1) will provide a total tensile strength of 1120 lbs. Generally, a force of about one pound per foot is required to move a handrail of this character and under these conditions the overall length of the handrail could be 1120 feet.

The anti-friction covering 15 of a hard cotton duck makes it easier to move the handrail and prevents undue wear from rubbing at the edges and on the bottom of the transmission belt. In constructing the handrail, the anti-friction covering which is skimmed on one side with rubber and is bare on the other side, is wrapped around the reinforced belt and is cemented thereto, with the bare side of the cover out. A butted seam of the cover extends along the top of the belt and a rubber extrusion is then laid lengthwise on top of the transmission member over the butted seam of the cover to form the web which connects the transmission member to the hand rest. A second extruded rubber member which forms the hand rest is then placed on top of the extrusion forming the web. This assembly is then placed in a heated mold and vulcanized so that the web is integrally connected to the hand rest and the transmission member and the assembly is a unitary structure.

Successive lengths of the handrail may be joined to obtain the desired length by splicing the ends of the belt in the usual manner and overlapping opposing portions of the hand rest and the web prior to vulcanization. The ends of the handrail may be likewise joined to form a closed loop.

The handrail 10 embodying the present invention is especially suitable for use as a moving hand support in conjunction with a passenger conveyor, such as a moving sidewalk or moving stairs. The passenger conveyor may be of any suitable type and an example of such a conveyor is illustrated and described in application S.N. 547,348 for U.S. Letters Patent, filed on November 17, 1955, in the name of William F. Bankauf, for Passenger Conveyor, and hence, need not be described in detail.

In such an installation, the moving handrail runs in tracks 16 which are supported at the top of fixed panels 17 extending upwardly from a moving sidewalk 18 at each side thereof. The tracks 16 have flanges 19 which extend inwardly in opposing relation toward the web of the handrail and define channels which guide the transmission member. The flanges form a restricted opening through which the web of the handrail extends and, if desired, finger guards 20 may be mounted on top of the flanges to fill the space between the bottom of the hand rest and the flanges. The tracks will follow the path of movement of the passenger conveyor and may include curves in a horizontal plane as well as curves in a vertical plane.

The installation shown diagrammatically in FIG. 1 is merely illustrative of the various types of curves and bends which the handrail made in accordance with the present invention can follow.

As shown in FIG. 1, spaced portions of the handrail move parallel to each other in a horizontal plane in a forward direction from an entrance, then around a curve and then in a return direction to an exit, as indicated by arrows. At the entrance and exit, the handrail moves in a vertical plane between two sets of spaced upper and lower pulleys 21 and 22. Between the two sets of lower pulleys, the handrail runs over direction changing pulleys 23 which rotate on vertical axes and with the handrail being twisted through an angle of 90° in the spans between such pulleys and the lower pulleys at the entrance and exit. The handrail may be driven from an electric motor or other suitable source of power (not shown) which is connected to one of the upper pulleys at the exit through a drive member 24.

In the embodiment of the handrail shown in FIG. 7, the upper portion or hand rest 11' is tubular and incorporates one or more plies of a reinforcing fabric, such as a braided fabric, which will permit the hand rest to flex in all directions. In order to prevent the tubular hand rest from collapsing or being deformed in movement around curves or the like, it may be inflated with air.

In the embodiment of the handrail shown in FIG. 8, a wire cable 30 is incorporated in the web of the handrail 10 to increase the tensile strength of the handrail. The cable 30 is located in the connecting web on the transverse center of the handrail and as close as possible to the transmission member so as not to interfere with bending of the handrail around curves in a vertical plane.

It will be understood that various modifications and changes may be made in the embodiments of the invention illustrated and described herein without departing from the scope of the invention as defined by the claims appended hereto.

I claim:

1. A moving handrail for use in conjunction with a moving passenger conveyor which comprises a hand supporting member which is flexible in both horizontal and vertical planes; a flat transmission belt incorporating at least one reinforcing ply of a woven fabric, said belt being capable of being bent around curves in a vertical plane and in a horizontal plane; an anti-friction covering of woven fabric surrounding said drive belt; and a web of flexible material integrally connecting the hand supporting member to the covered transmission belt, said web being located at the center of the top surface of the covered transmission belt.

2. A moving handrail for use in conjunction with a moving passenger conveyor as defined in claim 1, wherein the hand supporting member is a solid member formed from a rubber-like material and the handrail has a T-shaped section.

3. In a moving handrail for use in conjunction with a moving passenger conveyor as defined in claim 1 wherein the hand supporting member is tubular and is inflatable with air.

4. In a moving handrail for use in conjunction with a moving passenger conveyor as defined in claim 1 which includes a wire reinforcing cable incorporated in the web connecting the hand support and the transmission belt, said cable being located on the transverse center line of transmission belt and adjacent the upper surface thereof.

5. A moving handrail which comprises a hand supporting member formed of a stretchable rubber-like material which is capable of being bent in both horizontal and vertical planes, a connecting web formed integrally with the hand supporting member and extending downwardly therefrom, said web being located at the center of the hand supporting member, a flat drive belt attached to the connecting web at the lower end thereof and extending outwardly therefrom, said belt including at least one reinforcing ply of a woven fabric and being bendable in a horizontal plane and in a vertical plane, and an anti-friction covering surrounding said drive belt.

6. A moving handrail as defined in claim 5 which includes a single tension member located in the connecting web on the transverse center of the hand supporting member and adjacent the upper surface of the drive belt.

References Cited in the file of this patent

UNITED STATES PATENTS

| | | |
|---|---|---|
| 829,152 | Hocquart | Aug. 21, 1906 |
| 1,101,209 | Pitt | June 23, 1914 |
| 2,028,358 | Shonnard | Jan. 21, 1936 |
| 2,373,764 | Lautrup et al. | Apr. 17, 1945 |
| 2,526,324 | Bloomfield | Oct. 17, 1950 |
| 2,628,700 | Masek | Feb. 17, 1953 |